United States Patent [19]
Larsson

[11] 3,874,860
[45] Apr. 1, 1975

[54] APPARATUS FOR SEPARATING PARTICULATE MATTER FROM A FLOWING MEDIUM

[75] Inventor: Bertil Sven Vilhelm Larsson, Johanneshov, Sweden

[73] Assignee: Aktiebolaget Svenska Flaktfabriken, Nacha, Sweden

[22] Filed: Mar. 29, 1973

[21] Appl. No.: 346,185

[30] Foreign Application Priority Data
Apr. 10, 1972 Sweden.............................. 4595/72

[52] U.S. Cl...................... 55/244, 55/227, 55/260, 55/315, 55/431, 209/10, 302/20, 302/28
[51] Int. Cl............................................. B01d 47/02
[58] Field of Search...... 55/239, 260, 428, 431–433, 55/459, 466, 227, 244, 315; 209/10, 144; 302/20, 28, 59

[56] References Cited
UNITED STATES PATENTS

| | | | |
|---|---|---|---|
| 788,791 | 5/1905 | Trump | 302/57 X |
| 866,804 | 9/1907 | Olson | 302/20 X |
| 911,802 | 2/1909 | Baldwin | 302/20 X |
| 1,380,698 | 6/1921 | Anspach et al. | 302/59 X |
| 2,819,930 | 1/1958 | Foreman | 302/20 |
| 2,973,993 | 3/1961 | Delagrange et al. | 302/59 |
| 3,210,061 | 10/1965 | Nogiwa | 302/51 X |
| 3,236,565 | 2/1966 | Kester et al. | 302/21 X |
| 3,309,785 | 3/1967 | King | 302/22 X |

FOREIGN PATENTS OR APPLICATIONS

| | | | |
|---|---|---|---|
| 491,489 | 3/1954 | Italy | 302/59 |
| 88,275 | 11/1921 | Germany | 302/59 |

*Primary Examiner*—Evon C. Blunk
*Assistant Examiner*—W. Scott Carson
*Attorney, Agent, or Firm*—Howson & Howson

[57] ABSTRACT

Apparatus for separating the waste material from the pneumatic conveying medium which is particularly applicable to systems for large buildings where the waste is transported away pneumatically. The separator is in two stages, the first stage being a somewhat conventional cyclone separator and the second stage being a wet separator for fine material. The separated fine material is discharged intermittently from the second separator through the first separator. The entire system is run from a single fan unit located downstream of the second separator for generating a suction in the separators as well as in the entire pneumatic waste disposal system. The same suction is used to withdraw the fine separated material from the second separator into the first separator. During the period when the material is discharged from the second separator, outside air is introduced into the separated fine material at a point midway between the top and the bottom of the collected fine material.

5 Claims, 1 Drawing Figure

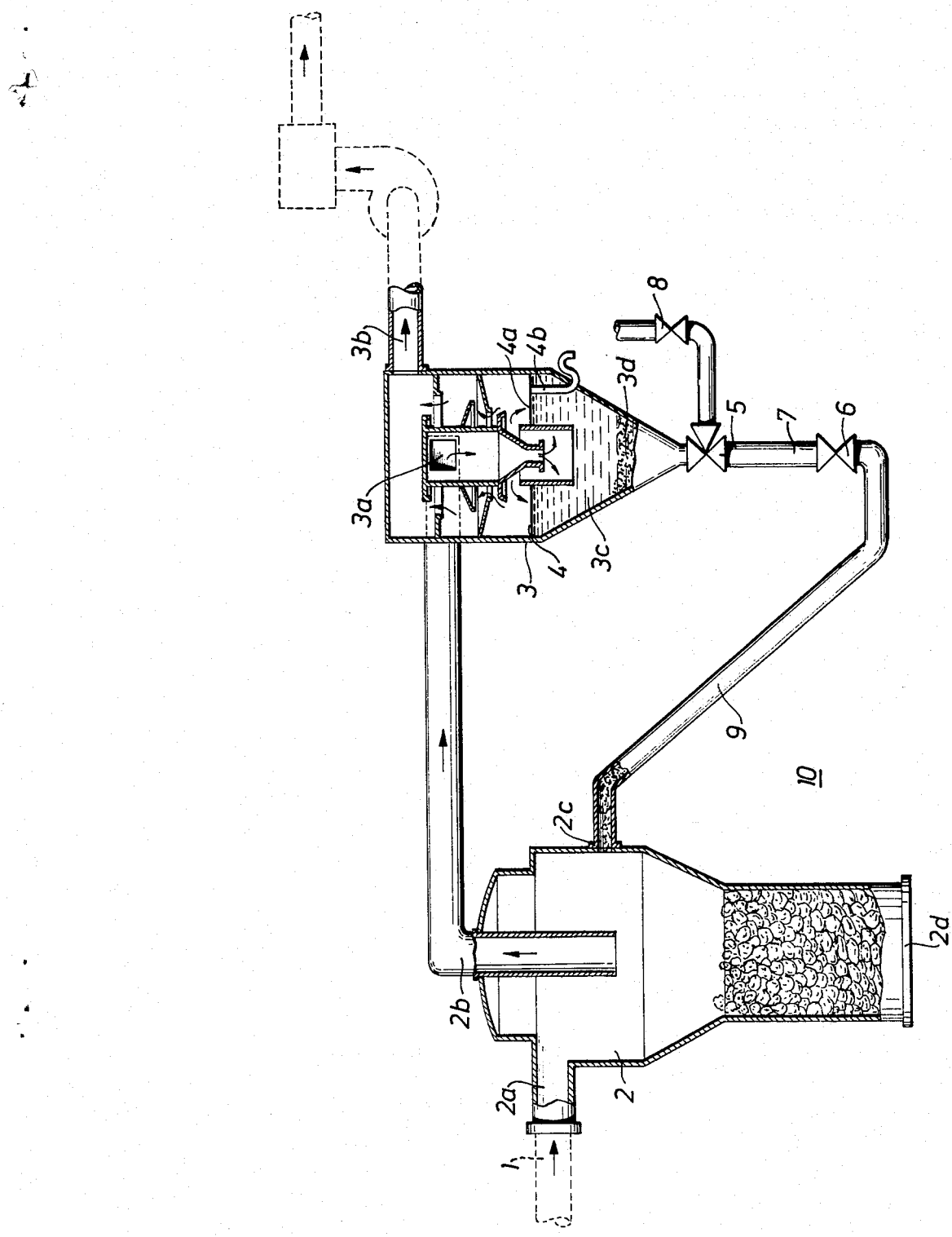

APPARATUS FOR SEPARATING PARTICULATE MATTER FROM A FLOWING MEDIUM

This invention relates to an arrangement for pneumatic conveyance of waste material from a number of closable openings, through which the waste material is introduced into the pneumatic installation for being conveyed to a coarse separator and a subsequent fine separator of dust. In an installation of this kind, which is intended for residential areas, hospitals, industrial buildings etc., refuse and waste material are introduced on each storey through closable openings into vertical pipe shafts and collected above the bottom valve, which is a sluice means to a system of horizontal main ducts, in which the vacuum required for the conveyance of the material is maintained by a fan unit common to all ducts. The pneumatic conveying installation is provided with a damper-controlled air intake at a peripheral portion of each main duct, and the suction side of the common fan unit is connected to the aforesaid horizontal main ducts by means of separators acting as coarse separator and, respectively, fine separator, which are connected in series to separate conveying air from refuse and waste material, in the manner described and shown a.o. in the Swedish Laid Open Document No. 341.676. The course separator preferably is disposed above a refuse combustion furnace, or it may be located above a compacting machine, from which the separated dust can be transported in a container. After having been cleaned finally in the fine separator, the conveying air passes via a stop valve and a sound trap out into the free air. From time to time it is necessary to shut down the installation and to clean the fine separator. This shutdown of the installation and cleaning of the fine separator not only must be supervised and requires much time, it is in many cases also a dirty and unhygienic work, which may also be injurious to health. This is particularly the case when the installation is intended to convey infected material from hospitals, slaughterhouses and the like, or directly poisonous waste material from chemical laboratories. In certain cases the material may be radioactive waste. The present invention relates to an arrangement, which eliminates said disadvantages and shortcomings and renders possible continuous operation of the pneumatic waste material conveying installation.

The arrangement according to the invention is substantially characterized in that the fine separator is constructed to continuously receive the dust and, at continuous operation of the central installation, intermittently to transfer the dust, without any contact with the surrounding atmosphere, to the coarse separator. An expedient embodiment of the arrangement is characterized in that the fine separator is provided with vessels for increasing by wetting the weight of the dust and thereby to facilitate the separation of the sedimented dust by the force of gravity in the course separator. A preferred embodiment of the arrangement according to the invention is characterized in that it comprises a collecting chamber located below the fine separator and provided with feed and discharge covers, that the collecting chamber has a separate openable inlet for atmospheric air, which by utilization of the vacuum in the coarse separator is intended to be sucked through a separate connecting duct to the coarse separator and thereby to convey the sedimented heavy dust to the coarse separator. Said feed and discharge covers and the openable inlet for atmospheric air may preferably be constructed for manual or automatic control, in response to a timer or a means sensing the amount of sedimented dust.

The invention is described in greater detail in the following, with reference to the accompanying drawing showing a section through an exemplifying embodiment of the arrangement.

In the drawing, 1 is a collective designation of that part of the pneumatic conveying installation which comprises a number of vertical pipe shafts with closable openings for introduction of the waste material. 2 designates a coarse separator with an inlet 2a, a central pipe 2b for directing conveying air further to a subsequent fine separator 3. 2c designates an inlet for introducing by vacuum sedimented dust as slurry from said fine separator 3. A bottom opening for the discharge of coarsely separated dust mixed with said slurry is designated by 2d. The fine separator 3 is provided with an inlet 3a and an outlet 3b. A conical lower portion of the fine separator is designated by 3c, and 3d is the designation for collected sedimented slurry in the lower part of the conical portion of the fine separator. 4 designates a level-controlled water supply rendering a water surface designated by 4a. An overflow is designated by 4b. 7 is an intermediate pipe, which opens into a pipe duct 9 for the transfer of sedimented dust in the form of slurry back to the coarse separator 2 through its inlet 2b. 5 and 6 designate an upper and, respectively, a lower throttle damper to the intermediate pipe 7. 8 is a solenoid valve allowing separate conveying air to enter in order to facilitate the slurry transfer to the coarse separator in the manner described above. Said transfer is effected by means of the strong vacuum prevailing in the coarse separator 2. 10 designates the free, i.e. the surrounding atmosphere. The numeral 11 designates a part (not shown in detail) of the pneumatic installation which is located after the coarse separator 2 and the fine separator 3, i.e. a pipe duct leading to a strong fan unit common to the entire pneumatic conveying installation. A stop valve is assumed to be mounted in known manner before the fan unit, and a sound trap located after the fan unit directs the conveying air out into the free air.

What is claimed is:

1. Apparatus for separating particulate matter from a gaseous medium, comprising:
    a coarse particle separator having an inlet, an outlet, a separating zone, and a collecting chamber below the separating zone;
    a fine particle separator having an inlet, an outlet, a separating zone, and a collecting chamber below the separating zone;
    means for wetting particulate matter in said fine particle separator;
    main conduit means connecting the outlet of said coarse particle separator with the inlet of said fine particle separator;
    means for flowing the medium through said separators and creating in the separating zone of said coarse particle separator a sub-atmospheric pressure;
    return conduit means connecting the collecting chamber of said fine particle separator with the separating zone of said course particle separator;
    feed valve means connected in said return conduit means;

discharge valve means connected in said return conduit means downstream of said feed valve means to cooperate therewith for defining another collecting chamber in said return conduit; and vent means connected to said return conduit for selectively admitting and blocking atmospheric air pressure to said return conduit collecting chamber, so that when said feed valve is closed and said discharge valve and vent are open, wetted particulate matter contained in the return conduit collecting chamber is conveyed pneumatically to the coarse particle separator.

2. Apparatus for separating particulate matter from a gaseous medium, comprising:

a first separator having a separating chamber and a collecting chamber;

a second separator having a separating chamber and a collecting chamber;

main conduit means connecting said separating chambers in series for effecting separation of said particulate matter in successive stages;

means for flowing said medium continuously through said separating chambers and producing a pressure in said first separator;

return conduit means connecting the collecting chamber of said second separator with the separating chamber of said first separator;

feed valve means connected in said return conduit means for admitting thereinto particulate matter from the collecting chamber of said second separator;

discharge valve means connected in said return conduit means a spaced distance from said feed valve means for cooperating therewith to define in said return conduit means another collecting chamber;

means providing a valved inlet for said return conduit collecting chamber to admit thereinto a gas at a pressure greater than the pressure in said first separator;

so that when the feed valve means is closed and the discharge valve means and valved inlet are opened, particulate matter contained in the return conduit collecting chamber is conveyed pneumatically to the separating chamber of the first separator for collection in its collecting chamber.

3. Apparatus according to claim 2 wherein said medium flowing means includes an exhaust fan connected to the separating chamber of said second separator for causing said pressure in said first separator to be below atmospheric and inducing in said main conduit a draft for conveying said medium to said second separator from said first separator, and said vented inlet has one end open to the ambient atmosphere and another end opening into said return conduit collecting chamber, whereby the exhaust fan cooperates with the first separator to create a pressure differential across the collecting chamber in the return line for pneumatically conveying to the first separator the particulate matter in the return line collecting chamber.

4. Apparatus according to claim 3 wherein said first separator is capable of separating coarse relatively-heavy particulate matter from said flowing medium and said second separator is capable of separating fine lighter particulate matter from said flowing medium, and including means for increasing the weight of the fine particulate matter in the second separator to enable the same to be separated and collected in the first separator after being transferred thereto through said return conduit.

5. Apparatus for separating particulate matter from a medium comprising:

a coarse particle separator having a separating chamber and a collecting chamber;

a fine particle separator having a separating chamber and a collecting chamber;

means for increasing the weight of fine particulate matter in said fine separator;

means connecting the separating chamber of the coarse particle separator with the separating chamber of the fine particle separator;

means for flowing said medium through said separators and inducing in said coarse particle separator a sub-atmospheric pressure;

means located intermediate the collecting chamber of the fine particle separator and the collecting chamber of the coarse particle separator and providing therebetween a third collecting chamber for accepting particulate matter separated from said fine separator;

valve means associated with said third collecting chamber, said valve means having one operating position for admitting fine particulate matter into said third collecting chamber while blocking flow from said third collecting chamber to said coarse separator, and said valve means having another operating position for blocking admission of fine particles into said third chamber from said fine separator while affording flow to said coarse separator from said third collecting chamber; and means for closing said third collecting chamber to atmospheric air pressure when said valve means is in said one operating position and for opening said third collecting chamber to atmospheric air pressure when said valve means is in said other operating position;

whereby fine particulate matter collected in the third collecting chamber when the valve means is in its one operating position is transferred pneumatically to the coarse separator when the valve means is in its other operating position and the third collecting chamber is open to atmospheric air pressure.

* * * * *